US010247556B2

(12) United States Patent
Mourikis

(10) Patent No.: US 10,247,556 B2
(45) Date of Patent: Apr. 2, 2019

(54) METHOD FOR PROCESSING FEATURE MEASUREMENTS IN VISION-AIDED INERTIAL NAVIGATION

(71) Applicant: The Regents of the University of California, Oakland, CA (US)

(72) Inventor: Anastasios Mourikis, Riverside, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 14/907,210

(22) PCT Filed: Jul. 23, 2014

(86) PCT No.: PCT/US2014/047839
§ 371 (c)(1),
(2) Date: Jan. 22, 2016

(87) PCT Pub. No.: WO2015/013418
PCT Pub. Date: Jan. 29, 2015

(65) Prior Publication Data
US 2016/0161260 A1   Jun. 9, 2016

Related U.S. Application Data

(60) Provisional application No. 61/857,583, filed on Jul. 23, 2013.

(51) Int. Cl.
*G01C 21/00* (2006.01)
*G01C 21/16* (2006.01)
*G01S 19/13* (2010.01)

(52) U.S. Cl.
CPC .......... *G01C 21/16* (2013.01); *G01C 21/165* (2013.01); *G01S 19/13* (2013.01)

(58) Field of Classification Search
CPC ........ G01C 21/16; G01C 21/165; G01S 19/13
(Continued)

(56) References Cited

U.S. PATENT DOCUMENTS

2008/0279421 A1* 11/2008 Hamza .................. B64G 1/646
382/103
2009/0022369 A1* 1/2009 Satoh ..................... G01B 21/04
382/106

(Continued)

OTHER PUBLICATIONS

Li, Mingyang, et al, "Online Temporal Calibration for Camera-IMU Systems: Theory and Algorithms", Dept. of Electrical Engineering, University of California, Riverside, 16 pages, Riverside, California.
Li, Mingyang, et al., "3-D Motion Estimation and Online Temporal Calibration for Camera-IMU Systems", Dept. of Electrical Engineering, University of California, Riverside, 8 pages, Riverside, California.

(Continued)

Primary Examiner — Shardul D Patel
(74) Attorney, Agent, or Firm — Jeffrey G. Sheldon; Cislo & Thomas LLP

(57) ABSTRACT

A mobile platform having a camera for outputting image data of features with unknown locations, an inertial measurement unit for outputting inertial measurements of the features, where the coordinates of the features are unknown, a processor, storage and an extended-Kalman filter-based estimator executable on the processor for processing the inertial measurement and features of the image data, where a state vector of the estimator contains a sliding window of states for determining the position and orientation of the mobile platform.

19 Claims, 4 Drawing Sheets

(58) Field of Classification Search
USPC .................................................. 701/468, 500
See application file for complete search history.

(56) References Cited

U.S. PATENT DOCUMENTS

| | | | | |
|---|---|---|---|---|
| 2009/0248304 A1* | 10/2009 | Roumeliotis | .......... | G01C 21/16 701/500 |
| 2010/0110187 A1* | 5/2010 | von Flotow | ......... | G01C 11/025 348/144 |
| 2012/0194517 A1* | 8/2012 | Izadi | ....................... | G06T 17/00 345/420 |
| 2013/0138247 A1* | 5/2013 | Gutmann | ............. | G05D 1/0231 700/253 |
| 2013/0191019 A1* | 7/2013 | Pakzad | ................ | G01C 21/206 701/454 |
| 2014/0316698 A1* | 10/2014 | Roumeliotis | ........ | G01C 21/165 701/500 |

OTHER PUBLICATIONS

Mourikis, Anastasios I., "Method for Processing Feature Measurements in Vision-Aided Inertial Navigation", Dept. of Electrical Engineering, University of California, Riverside, 3 pages, Riverside, California.

Li, Mingyang, et al., "Improving the Accuracy of EKF-Based Visual-Inertial Odometry", Proceedings of the IEEE International Conference on Robotics and Automation, May 2012, 8 pages, St Paul, Minnesota.

Li, Mingyang, et al, "Optimization-Based Estimator Design for Vision-Aided Inertial Navigation", Proceedings of Robotics: Science and Systems, Jul. 2012, 8 pages, Sydney, Australia.

Mourikis, Anastasios I., "Method for Processing Feature Measurements in Vision-Aided Inertial Navigation," 7 pages.

United States Patent and Trademark Office, International Search Report Issued in PCT/US2014/047839, dated Jul. 10, 2015, 2 pages.

United States Patent and Trademark Office, Written Opinion Issued in PCT/US2014/047839, dated Jul. 10, 2015, 10 pages.

* cited by examiner

METHOD FOR PROCESSING FEATURE MEASUREMENTS IN VISION-AIDED INERTIAL NAVIGATION

CROSS-REFERENCE TO RELATED APPLICATIONS

This application is a national phase application of International Application No. PCT/US2014/047839, filed on Jul. 23, 2014, which claims the benefit of U.S. Provisional Application No. 61/857,583, filed on Jul. 23, 2013, the contents of which are incorporated herein by reference in their entirety.

STATEMENT REGARDING FEDERALLY SPONSORED RESEARCH DEVELOPMENT

This invention was made under contract with The National Science Foundation under contract No. IIS-1117957. The United States Government has certain rights in this invention.

FIELD OF THE INVENTION

The present invention relates to methods for vision-aided inertial navigation, more specifically to a method for tracking the position and orientation of a platform using inertial measurements and observations of features whose coordinates are not known in advance.

BACKGROUND

The current focus is on vision-aided inertial navigation methods that provide estimates by fusing measurements from a camera and an inertial measurement unit (IMU). In recent years, several algorithms of this kind have been proposed, tailored for different applications. For instance, if features with known coordinates are available, map-based localization algorithms can be used to provide absolute-pose estimates However, environments with a priori known feature maps are not abundant, and therefore it is crucial to develop methods that enable operation in unknown environments, using naturally-occurring features whose locations in the world are not known in advance.

A variety of methods have been proposed for this task, ranging from simultaneous localization and mapping, to pairwise image-based displacement estimation, as well as multi-frame methods that employ the feature measurements to impose constraints on a number of camera poses. The two most significant characteristics of any method are the accuracy it can achieve, and the computational resources it requires. Typically, simple and approximate methods have low cost but yield low accuracy, while more computationally complex methods can attain higher estimation precision. Developing methods that attain high precision at low computational cost, and that are robust enough to operate in real-world settings, remains challenging.

Therefore, there is a need for a method for tracking the motion state (e.g., position and orientation) of a platform using inertial measurements and observations of features with unknown locations, overcoming the limitations of the prior art.

SUMMARY

The present invention satisfies the need in the prior art directed to a method for tracking the position and orientation of a platform using inertial measurements and observations of features where coordinates are not known in advance.

In particular, the mobile platform comprises a body; a camera for outputting image data of features with unknown locations; an inertial measurement unit for outputting inertial measurements of the features; a processor configured to receive the image data and inertial measurements; storage for storing the image data and the inertial measurements; and an extended-Kalman filter-based estimator executable on the processor for processing the inertial measurement and features of the image data, wherein a state vector of the estimator contains a number states for determining the position and orientation of the mobile platform. Furthermore, the platform comprises an algorithm executable on the processor for calculating g a matrix that represents the information of the feature measurements for estimating the platform states, and using this matrix for performing updates in the extended Kalman filter.

The camera is selected from the group consisting of a video camera, a photographic camera, a depth-sensing camera, a time-of-flight depth sensor camera, a structured-light depth-inferring camera and an infrared camera. The camera may includes a GPS to provide coordinates of the mobile platform that can be used as inputs for a state estimator. The inertial measurement unit comprises one or more gyroscopes, accelerometers, magnetometers, and barometers. The multiple measurements of each features are processed by the estimator.

The method for tracking the position and orientation of the platform comprises: receiving at least one image of features from the camera, wherein at least some of the features' 3D positions are not known a priori; receiving inertial measurements of the features; transferring the feature and inertial measurements to the extended-Kalman filter-based estimator; processing the at least one image using the feature state information and the inertial measurements using the extended-Kalman filter-based estimator; determining the value of at least one of position, orientation, and velocity and of the mobile platform; and storing in the storage the determined value for comparison with new state information. Furthermore the method comprises: the storing in storage an estimate of the sliding window of state vectors; and defining a representation of uncertainty in the estimate, wherein the uncertainty is represented by a matrix of the covariance of the errors in the estimates.

Furthermore, each state vector is associated with a time instant recording of an image, sensor measurements, or both an image and sensor measurements. The sliding window state vectors comprise a current inertial measurement unit state, inertial measurement unit biases, inertial measurement unit scale factors, states of a number of feature points, camera intrinsic parameters, and camera-to-inertial measurement unit extrinsic parameters.

The state vectors include platform states corresponding to the time instants that a number of inertial measurements were recorded. The platform states are selected from the group consisting of camera, inertial measurement unit positions, orientations, velocities and rotational velocities. The measurements comprise images, feature observations or both images and feature observations. The extended-Kalman filter-based estimator processes multiple measurements of each feature. The measurements of a feature are used to obtain an estimate for the feature's location.

The estimates may be calculated using an error-minimization method comprising: computing residuals, where the residuals describe the difference between the stored measurements and the measurements predicted by the extended- Kalman filter-based estimator based on the estimates of the stored states; calculating Jacobian matrices of the measurements; calculating a matrix that represents the information from feature measurements for estimating the platform states using residuals and Jacobian matrices; and processing feature measurements without explicitly including estimates of the feature states in the EKF state vector. Calculating the Jacobian matrices is performed by differentiation, numerically or both differentiation and numerically. The Jacobian matrices are pre-multiplied by a quantity that is an inverse square root of the measurement covariance matrix.

Furthermore, the method for tracking the position and orientation of the platform may comprise: computing a factorization of the matrix that represents the information from feature measurements for estimating the platform states; updating the estimator state using the computed factor matrix as the measurement Jacobian; and updating the estimator's representation of the states estimates' uncertainty using the factor matrix. Computing the factorization of the matrix is computed incrementally by incorporating each of the features sequentially.

BRIEF DESCRIPTION OF THE DRAWINGS

These and other features, aspects and advantages of the present invention will become better understood with regard to the following description, appended claims, and accompanying figures.

DETAILED DESCRIPTION

Figure 1:
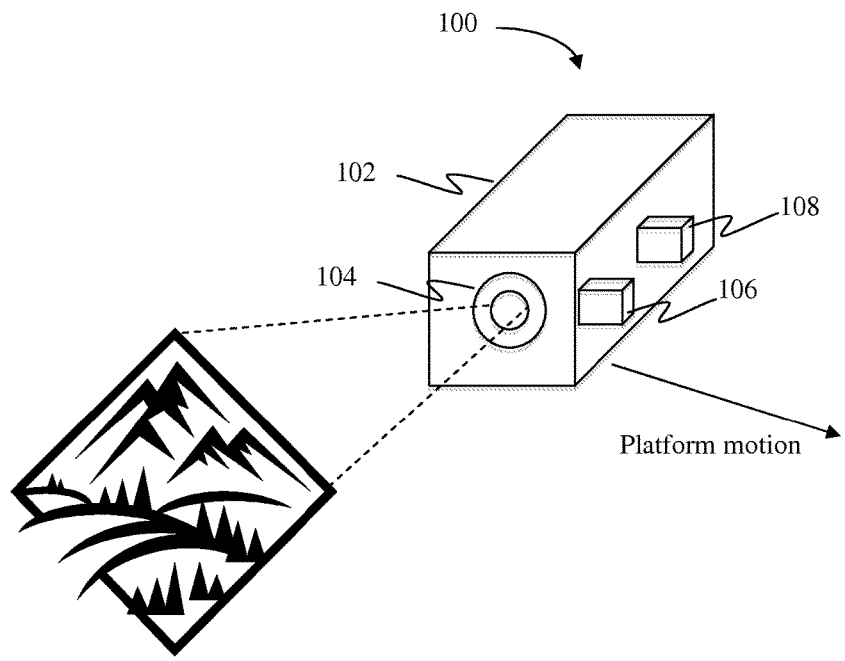
FIG. 1 is a diagram of a platform using inertial measurements and observations of naturally occurring features with unknown positions according to one embodiment.

The present invention overcomes the limitations of the prior art by providing a computationally efficient method for tracking the position and orientation of a platform using inertial measurements and observations of features with unknown world positions. As can be appreciated, the method described herein is able to track the position, orientation, velocity, and other significant quantities pertaining to the platform's motion, using inertial measurements and observations of naturally occurring features, whose positions are not known a priori. The method uses a novel formulation of an extended-Kalman filter (EKF)-based estimator for processing the measurements of features, whose state vector contains a sliding window of states, each corresponding to the time instant an image (or other sensor measurement) was recorded. In addition to this sliding window of states, the EKF's state vector can comprise a current IMU state, IMU biases, IMU scale factors, states of a number of feature points, camera intrinsic parameters, camera-to-IMU extrinsic parameters, and/or other states.

All dimensions specified in this disclosure are by way of example only and are not intended to be limiting. Further, the proportions shown in these Figures are not necessarily to scale. As will be understood by those with skill in the art with reference to this disclosure, the actual dimensions and proportions of any system, any device or part of a system or device disclosed in this disclosure will be determined by its intended use.

Methods and devices that implement the embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" or "an embodiment" in various places in the specification are not necessarily all referring to the same embodiment.

Throughout the drawings, reference numbers are re-used to indicate correspondence between referenced elements. In addition, the first digit of each reference number indicates the figure where the element first appears.

As used in this disclosure, except where the context requires otherwise, the term "comprise" and variations of the term, such as "comprising", "comprises" and "comprised" are not intended to exclude other additives, components, integers or steps.

In the following description, specific details are given to provide a thorough understanding of the embodiments. However, it will be understood by one of ordinary skill in the art that the embodiments can be practiced without these specific detail. Well-known circuits, structures and techniques may not be shown in detail in order not to obscure the embodiments. For example, circuits can be shown in block diagrams in order not to obscure the embodiments in unnecessary detail.

Also, it is noted that the embodiments can be described as a process that is depicted as a flowchart, a flow diagram, a structure diagram, or a block diagram. Although a flowchart can describe the operations as a sequential process, many of the operations can be performed in parallel or concurrently. In addition, the order of the operations can be rearranged. A process is terminated when its operations are completed. A process can correspond to a method, a function, a procedure, a subroutine, a subprogram, etc. When a process corresponds to a function, its termination corresponds to a return of the function to the calling function or the main function.

Moreover, a storage can represent one or more devices for storing data, including read-only memory (ROM), random access memory (RAM), magnetic disk storage mediums, optical storage mediums, flash memory devices and/or other machine readable mediums for storing information. The term "machine readable medium" includes, but is not limited to, portable or fixed storage devices, optical storage devices, wireless channels and various other mediums capable of storing, containing or carrying instruction(s) and/or data.

Furthermore, embodiments can be implemented by hardware, software, firmware, middleware, microcode, or a combination thereof. When implemented in software, firmware, middleware or microcode, the program code or code segments to perform the necessary tasks can be stored in a machine-readable medium such as a storage medium or other storage(s). One or more than one processor can perform the necessary tasks in series, distributed, concurrently or in parallel. A code segment can represent a procedure, a function, a subprogram, a program, a routine, a subroutine, a module, a software package, a class, or a combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted through a suitable means including memory sharing, message passing, token passing, network transmission, etc.

As can be appreciated the examples given herein are not meant to be limiting, only demonstrative.

In the following description, certain terminology is used to describe certain features of one or more embodiments of the invention.

The term "EKF" refers to algorithms and methods that utilize the extended Kalman filter (EKF) algorithm and method.

The term "feature," refers to points, lines, planes, or other objects and structures that can be detected by a sensor such as a camera.

The term "inertial measurement unit," refers to one or more than one device that measures and reports one or more of rotational velocity, orientation, specific force, acceleration, gravitational force or motion-descriptive quantities, using accelerometers, gyroscopes, magnetometers and/or other sensors.

Referring now to FIG. 1, there is shown a diagram 100 of a platform 102 using inertial measurements and observations of naturally-occurring features with unknown positions according to one embodiment. As can be seen, the platform 100 can comprise a camera 104, an IMU 106, a processor and a storage 108. The camera 104 can be a video or photographic camera, a depth-sensing camera, a time-of-flight depth sensor, a structured-light depth-inferring camera, an infrared camera, or other sensor. Optionally, the camera 104 can also provide GPS coordinates and other indicia that can be used as inputs for a state estimator described herein. The IMU 106 can comprise one or more gyroscopes and accelerometers, and potentially magnetometers, barometers, and additional sensors that can be used as inputs for a state estimator described herein. The camera 104 takes images with some of the available feature state information that is then sent to the estimator in the processor 108 for processing. Also, the IMU 106 transfers measurement information to the estimator in the processor 108 for processing. Once all the available data has been input to the estimator, the position, orientation, and additional quantities related to the platform and to its motion can be determined and stored in a storage 108 for comparison with new state information for tracking the platform.

Figure 2:
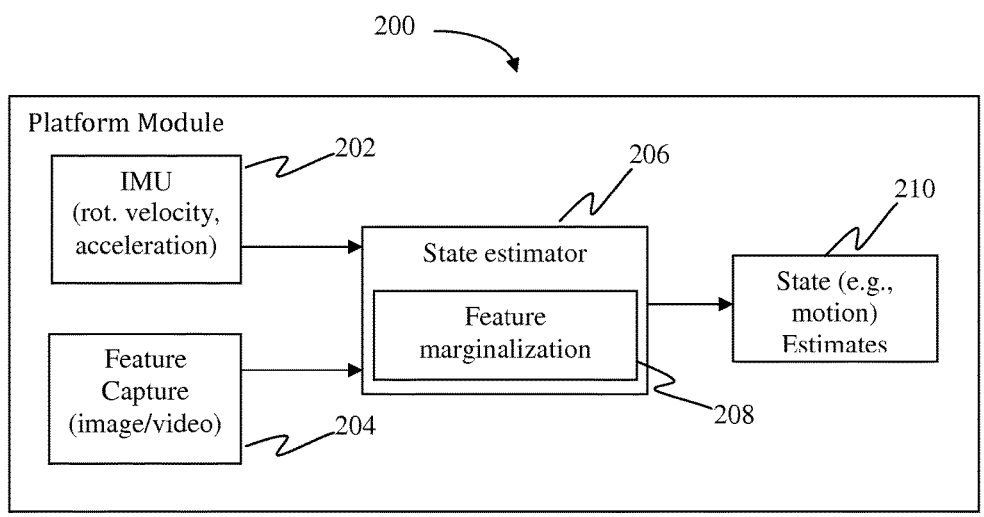
FIG. 2 is a block diagram of the platform of FIG. 1.

Referring now to FIG. 2, there is shown a block diagram 200 of the platform of FIG. 1. As can be seen, the platform 200 comprises an IMU 202, a camera 204 for feature capture, a state estimator 206 that comprises instructions for feature marginalization 208, and outputs state estimates 201. In one embodiment, the estimator 206 maintains an estimate of a state vector, as well as a representation of the uncertainty in this estimate, is defined. The estimator 206 can have a structure based on the EKF approach, in which the uncertainty is represented by a matrix that describes, to some level of approximation, the covariance of the errors in the estimates.

The state vector of the estimator 206 comprises a number of platform states (e.g., camera 204 or IMU 202 positions and orientations, velocities, rotational velocities), corresponding to the time instants a number of measurements (e.g., images or feature observations) were recorded, and optionally additional variables of interest.

Multiple measurements of each feature are processed by the estimator 206. This can occur, for example, when the tracking of a feature in the sensor data, or at the time when the number of feature observations reaches the number of states in the window of platform states kept in the estimator's state vector. At a given time instant, the measurements of a number of different features need to be processed by the estimator.

In one embodiment, all the measurements of a feature are used to obtain an estimate for the feature's location, optionally via an error-minimization process. Then, the estimator 206 computes residuals, that describe the difference between the recorded measurements and the measurements predicted based on the estimates of the stored states. Additionally, Jacobian matrices of the measurement function are calculated, either by differentiation, or numerically, or by other means.

Then, the residuals and the Jacobian matrices are manipulated so as to calculate a matrix that represents the information that the feature measurements provide for estimating the platform states (e.g., a Fisher information matrix). Using this method, the feature measurements are processed without explicitly including estimates of the feature states in the EKF state vector. Moreover, this process can be carried out efficiently, at a computational cost that scales quadratically with the number of times a feature has been observed, by exploiting the sparsity properties of the measurement Jacobians.

In one embodiment, the measurement residuals and Jacobian matrices are premultiplied by appropriate quantities (e.g., an inverse square root of the measurement covariance matrix) to simplify the estimator calculations.

In one embodiment, the steps above are repeated for each feature sequentially or in parallel, so as to compute a matrix describing the information provided by all features for estimating the platforms states in the EKF state vector.

Then, a factorization of this matrix is computed, which can be, in one embodiment, a Cholesky factorization. Optionally, for numerical stability, and to permit operation in the case in which the matrix is rank deficient, a version of the Cholesky factorization that uses pivoting is used. In the case where the matrix is rank deficient, some rows in the matrix will equal zero, and can be ignored from further computations.

In a different embodiment, the factorization of the information matrix is computed incrementally, by incorporating each of the features sequentially.

Next, the computed factor matrix can be used as the measurement Jacobian for an EKF update in the estimator. Using this factor matrix, a correction to the EKF state vector is computed and used to update the estimator's state estimate and the representation of its uncertainty (e.g., its estimated covariance matrix).

A key advantage of the above method for processing feature measurements is that it is effectively a "combination" of a covariance-form EKF with an inverse-covariance-form EKF. As a result, the method can take advantage of some of the computational characteristics of both. Specifically, since, in one embodiment, the method maintains an estimate of the state covariance matrix, it is computationally inexpensive to perform outlier-feature rejection via a Mahalanobis-distance gating test (as typical in covariance-form estimators). Moreover, the method can process the feature measurements at a cost that is linear in the number of features, by exploiting sparsity (as in inverse-covariance-form estimators).

Similarly to the multi-state constraint Kalman filter, this method does not include the feature states in the EKF state vector (which leads to computational complexity linear in the number of features). However, contrary to the MSCKF method, the present method uses a single factorization of an appropriately constructed information matrix, instead of the two QR factorizations that are used in the MSCKF during feature processing. As a result, the computational cost of the proposed method is lower than that of the MSCKF.

Results from the application of the method for vision-aided inertial navigation can be seen using a simulated dataset. The trajectory and feature characteristics of the dataset have been generated so as to emulate those of a real-world dataset, collected by a hand-held mobile device by a walking person. The total trajectory length is 1.1 km, covered over 16 minutes of walking. On average, 200 point features are tracked in each image, and their world positions and track lengths are generated to match those of the features tracked in the real dataset. The IMU 202 is providing measurements at 200 Hz, while the camera 204 images are available at 10 Hz.

The specific algorithm implemented in this embodiment of the method is described in Algorithm 1, of the attached document "*Method For Processing Feature Measurements In Vision-Aided Inertial Navigation*" by Anastasios I. Mourikis. To obtain consistent state estimates, the method described in: "*Improving the accuracy of EKF-based visual-inertial odometry*," in Proceedings of the IEEE International Conference on Robotics and Automation, St Paul, Minn., May 2012, pp. 828-835, is used.

Figure 3:
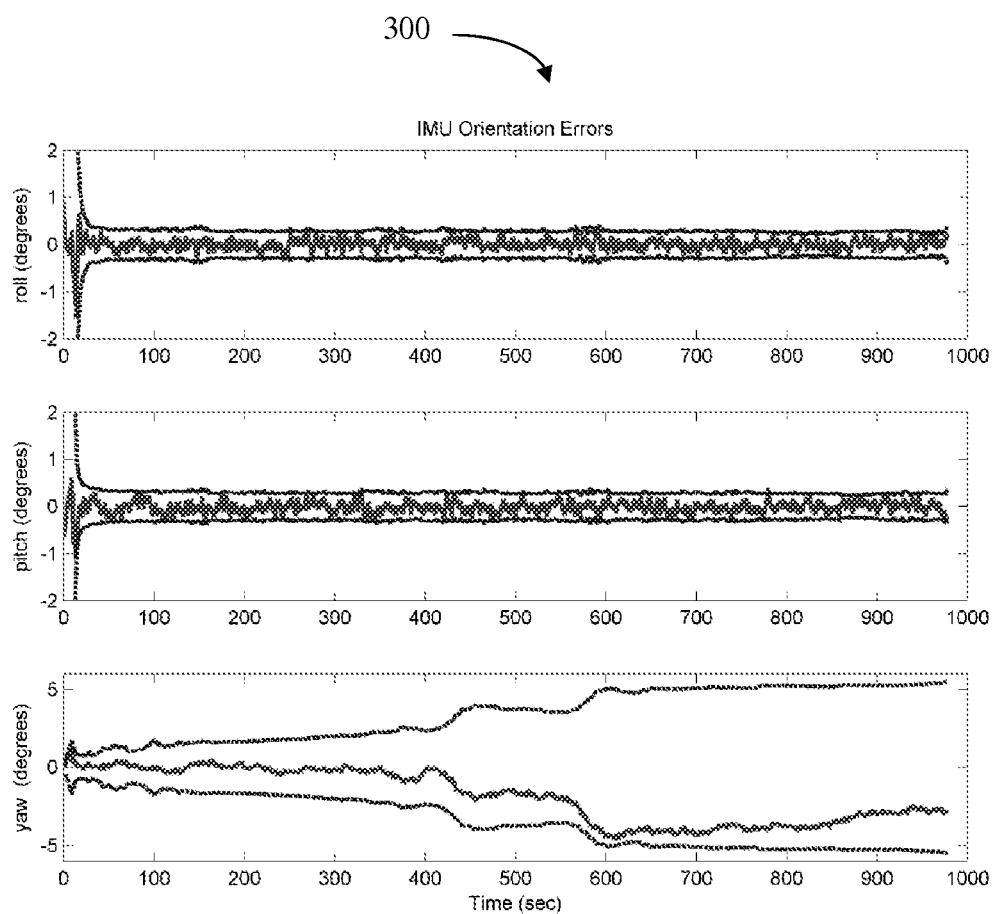
FIG. 3 is a plot showing the orientation errors resulting from using the described method to track the motion of a mobile platform in a specific embodiment. The red lines represent the orientation errors, while the dashed blue lines represent the ±3 standard-deviation uncertainty envelope reported by the method.

Referring now to FIG. 3, there are shown the estimation errors for the IMU orientation (red lines), as well as the uncertainty envelope defined by ±3 standard deviations (dashed blue lines), computed using the filter's reported covariance matrix.

Figure 4:
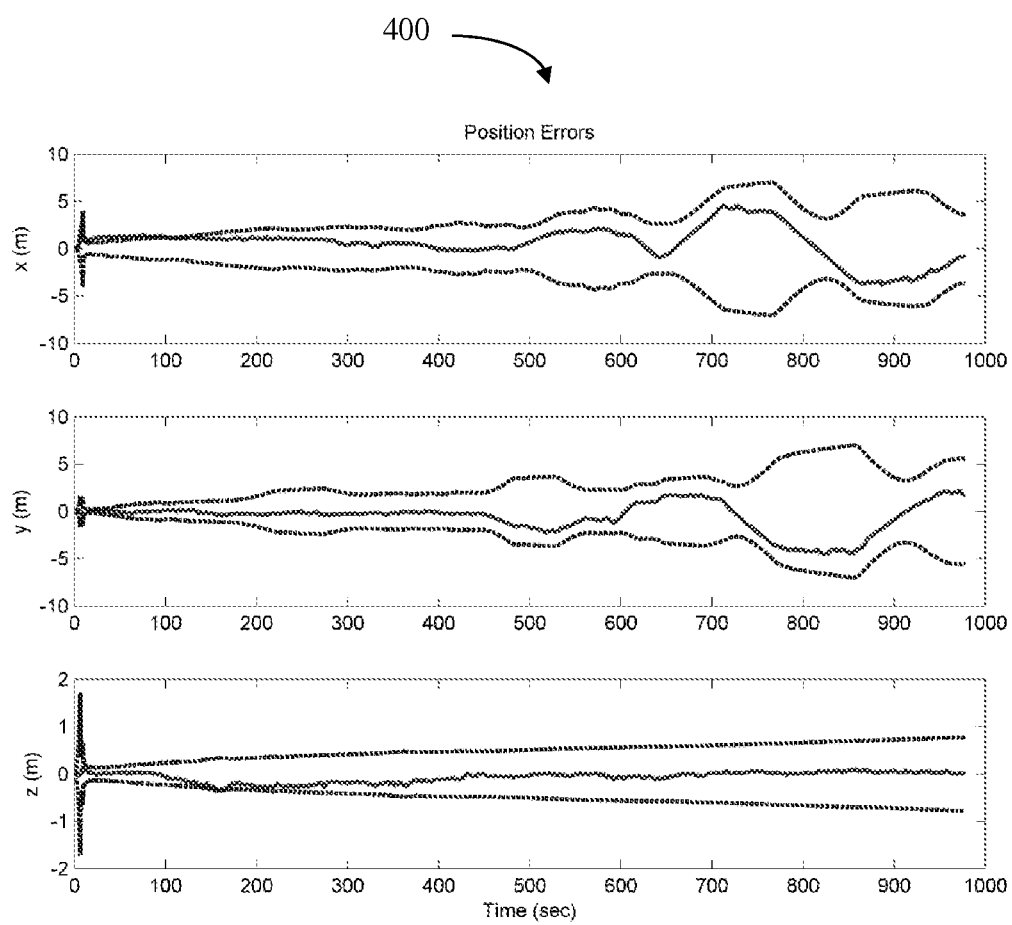
FIG. 4 is a plot showing the position errors resulting from using the described method to track the motion of a mobile platform in a specific embodiment. The red lines represent the orientation errors, while the dashed blue lines represent the ±3 standard-deviation uncertainty envelope reported by the method.

Referring now to FIG. 4, there are shown the estimation errors for the IMU position (red lines), as well as the uncertainty envelope defined by ±3 standard deviations (dashed blue lines), computed using the filter's reported covariance matrix.

Figure 5:
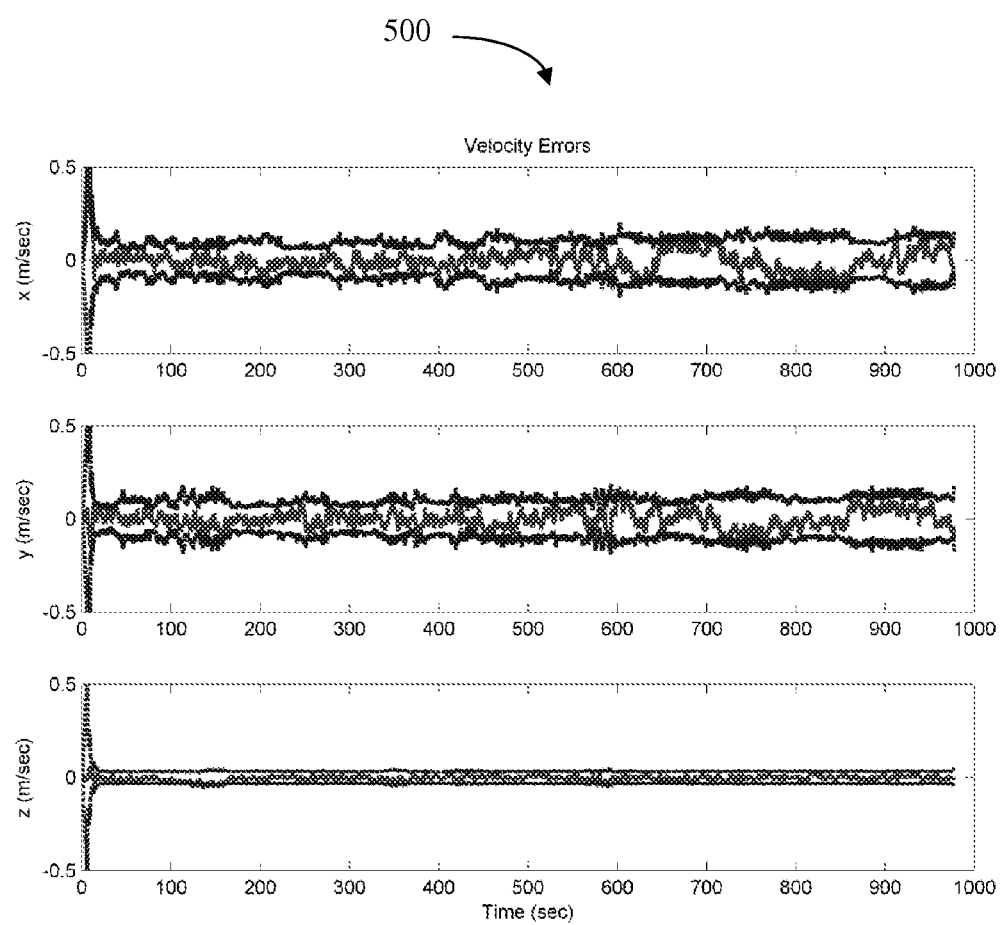
FIG. 5 is a plot showing the velocity errors resulting from using the described method to track the motion of a mobile platform in a specific embodiment. The red lines represent the orientation errors, while the dashed blue lines represent the ±3 standard-deviation uncertainty envelope reported by the method.

Referring now to FIG. 5, there are shown the estimation errors for the IMU velocity (red lines), as well as the uncertainty envelope defined by ±3 standard deviations (dashed blue lines), computed using the filter's reported covariance matrix.

As can be seen in FIGS. 3, 4, and 5, the described method is capable of achieving low estimation errors in long-term localization, with position drift remaining below 1\% of the distance traveled in this specific example. Moreover, the estimation errors are commensurate with the covariance matrix reported by the filter, indicating consistency.

The method for processing feature measurements described here can be employed for state estimation directly, or as part of a hybrid-EKF estimator to reduce the computational cost, as described by M. Li and A. I. Mourikis in "*Optimization-based estimator design for vision-aided inertial navigation*," in Proceedings of Robotics: Science and Systems, Sydney, Australia, July 2012. Moreover, in order to achieve consistent state estimates, the method described in: "*Improving the accuracy of EKF-based visual-inertial odometry*," in Proceedings of the IEEE International Conference on Robotics and Automation, St Paul, Minn., May 2012, pp. 828-835, can be employed in the implementation of the method. Both of these two methods are described in U.S. Provisional Patent Application 61/824,309. Additional supporting mathematical proofs of the method are described in "*Method For Processing Feature Measurements In Vision-Aided Inertial Navigation*" by Anastasios I. Mourikis. All documents described in this paragraph are hereby incorporated by reference in their entirety.

What has been described is a new and improved method for tracking the position and orientation of a platform using inertial measurements and observations of features with unknown locations, overcoming the limitations and disadvantages inherent in the related art. Although the present invention has been described with a degree of particularity, it is understood that the present disclosure has been made by way of example and that other versions are possible. As various changes could be made in the above description without departing from the scope of the invention, it is intended that all matter contained in the above description or shown in the accompanying drawings shall be illustrative and not used in a limiting sense. The spirit and scope of the appended claims should not be limited to the description of the preferred versions contained in this disclosure.

All features disclosed in the specification, including the claims, abstracts, and drawings, and all the steps in any method or process disclosed, can be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means" for performing a specified function or "step" for performing a specified function should not be interpreted as a "means" or "step" clause as specified in 35 U.S.C. § 112.

What is claimed is:

1. A mobile platform comprising:
   a) a camera for outputting image data of features with unknown locations, the features being objects, structures, and points, lines, and planes of objects and/or structures;
   b) an inertial measurement unit for outputting inertial measurements of the features, wherein the coordinates of the features are unknown;
   c) a processor configured to receive the image data and inertial measurements;
   d) storage for storing the image data and the inertial measurements; and
   e) an extended-Kalman filter-based estimator executable on the processor for processing the inertial measurement and features of the image data, wherein a state vector of the estimator contains a sliding window of states for determining the position and orientation of the mobile platform the state vector updated by computing and factorizing a rank deficient information matrix representing Fisher information provided by the feature measurements, the computed factor being used as the measurement Jacobian for updating the state vector.

2. The platform of claim 1, wherein the camera is selected from the group consisting of a video camera, a photographic camera, a depth-sensing camera, a time-of-flight depth sensor camera, a structured-light depth-inferring camera and an infrared camera.

3. The platform of claim 2 wherein the camera includes a GPS to provide coordinates of the mobile platform, and wherein the estimator receives the coordinates for processing.

4. The platform of claim 1 further comprising a GPS to provide coordinates of the mobile platform, and wherein the estimator receives the coordinates for processing.

5. The platform of claim 1, wherein the inertial measurement unit comprises one or more gyroscopes, accelerometers, magnetometers, and barometers.

6. A method for tracking the position and orientation of a mobile platform, the method comprising the steps of:
   a) receiving at least one image of features from a camera mounted on the mobile platform, the features being objects, structures, and points, lines, and planes of objects and/or structures, wherein the features positions are not known a priori;
   b) receiving from an inertial measurement unit mounted on the platform inertial measurements of the features, wherein the coordinates of the features are unknown;
   c) processing the at least one image using the feature state information and the inertial measurements using an extended-Kalman filter-based estimator to determine the value of at least one of position, orientation, and velocity and of the mobile platform; and
   d) storing the determined value for comparison with new state information; and
   (e) associating each sliding window of state vectors to a time instant recording of an image, sensor measurements, or both an image and sensor measurements, the state vector updated by computing and factorizing a rank deficient information matrix representing Fisher information provided by the feature measurements, the computed factor being used as the measurement Jacobian for updating the state vector.

7. The method of claim 6, wherein the sliding window state vectors comprise a current inertial measurement unit state, inertial measurement unit biases, inertial measurement unit scale factors, states of a number of feature points, camera intrinsic parameters, and camera-to-inertial measurement unit extrinsic parameters.

8. The method of claim 6 further comprising the steps of:
   storing in storage an estimate of the sliding window of state vectors; and
   defining a representation of uncertainty in the estimate, wherein the uncertainty is represented by a matrix of the covariance of the errors in the estimates.

9. The method of claim 8, wherein the sliding window of state vectors comprises platform states corresponding to the time instants that a number of inertial measurements were recorded.

10. The method of claim 9, wherein the platform states are selected from the group consisting of camera, inertial measurement unit positions, orientations, velocities and rotational velocities.

11. The method of claim 9, wherein the measurements comprise images, feature observations or both images and feature observations.

12. The method of claim 11, wherein the extended-Kalman filter-based estimator processes multiple measurements of each feature.

13. The method of claim 12, wherein the measurements of a feature are used to obtain an estimate for the feature's location.

14. The method of claim 8 further comprising the steps of:
   a) calculating the estimate using an error-minimization method;
   b) computing residuals, where the residuals describe the difference between the stored measurements and the measurements predicted by the extended-Kalman filter-based estimator based on the estimates of the stored states;
   c) calculating Jacobian matrices of the measurements;
   d) calculating a matrix that represents the information from feature measurements for estimating the platform states using residuals and Jacobian matrices; and
   e) processing feature measurements without explicitly including estimates of the feature states in the EKF state vector.

15. The method of claim 14, wherein calculating the Jacobian matrices is performed by differentiation, numerically or both differentiation and numerically.

16. The method of claim 15, further comprising the step of premultiplying the Jacobian matrices by a quantity that is an inverse square root of the measurement covariance matrix.

17. The method of claim 16 further comprising the step of processing feature measurements without explicitly including estimates of the feature states in the extended-Kalman filter-based estimator state vector.

18. The method of claim 14 further comprising the steps of:
   a) computing a factorization of the matrix;
   b) updating the estimator using the computed factor matrix as the measurement Jacobian; and
   c) computing an update the estimator's state estimate and the representation of its uncertainty using the factor matrix as a correction to the EKF state vector.

19. The method of claim 18, wherein computing the factorization of the matrix is computed incrementally by incorporating each of the features sequentially.

* * * * *